United States Patent
Krishnamurthy et al.

(10) Patent No.: US 11,458,429 B2
(45) Date of Patent: Oct. 4, 2022

(54) AIR FILTER WEAR LEVEL ESTIMATION AND REPLACEMENT TIMING PREDICTION METHOD

(71) Applicants: Nissan North America, Inc., Franklin, TN (US); Renault S.A.S., Boulogne-Billancourt (FR)

(72) Inventors: Vikram Krishnamurthy, Palo Alto, CA (US); Kusha Nezafati, Davis, CA (US); Cameron Hansen, Lincoln, CA (US); Robert Haran, Vacaville, CA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 49 days.

(21) Appl. No.: 16/400,828

(22) Filed: May 1, 2019

(65) Prior Publication Data

US 2020/0346155 A1 Nov. 5, 2020

(51) Int. Cl.
  *G06T 7/00* (2017.01)
  *H04N 5/225* (2006.01)
  *B01D 46/00* (2022.01)

(52) U.S. Cl.
  CPC ........ *B01D 46/0086* (2013.01); *G06T 7/001* (2013.01); *H04N 5/2256* (2013.01); *B01D 2279/60* (2013.01); *G06T 2207/10024* (2013.01); *G06T 2207/10152* (2013.01)

(58) Field of Classification Search
  CPC ............ B01D 46/0086; B01D 2279/60; G06T 7/001; G06T 2207/10024; G06T 2207/10152; H04N 5/2256
  USPC .......................................................... 348/129
  See application file for complete search history.

(56) References Cited

U.S. PATENT DOCUMENTS

| | | | |
|---|---|---|---|
| 2003/0030745 A1* | 2/2003 | Meek | H04N 5/2252 348/370 |
| 2004/0083895 A1* | 5/2004 | Kim | B01D 46/0086 96/414 |
| 2007/0132988 A1* | 6/2007 | Gargano | B01D 46/0086 356/237.6 |
| 2017/0278230 A1* | 9/2017 | Jones | G06T 7/001 |
| 2018/0128137 A1* | 5/2018 | Case | G07C 5/0816 |
| 2018/0209890 A1* | 7/2018 | Case | G01N 15/0826 |

OTHER PUBLICATIONS https://www.aaa.com/autorepair/articles/changing-your-cars-engine-air-filter, at least as early as Feb. 28, 2019.

* cited by examiner

*Primary Examiner* — Matthew K Kwan
(74) *Attorney, Agent, or Firm* — Young Basile Hanlon & MacFarlane, P.C.

(57) ABSTRACT

A system is disclosed for use in inspecting a vehicle's air filter. The system includes a receptacle defining an enclosed interior space that is configured to receive the air filter, and a light source that is positioned within the receptacle. The receptacle includes an upper wall with an aperture that is arranged in generally parallel relation to the air filter, and the light source is configured to support the air filter such that the light source backlights the air filter to facilitate capture of an image of the air filter through the aperture in the upper wall of the receptacle.

13 Claims, 4 Drawing Sheets

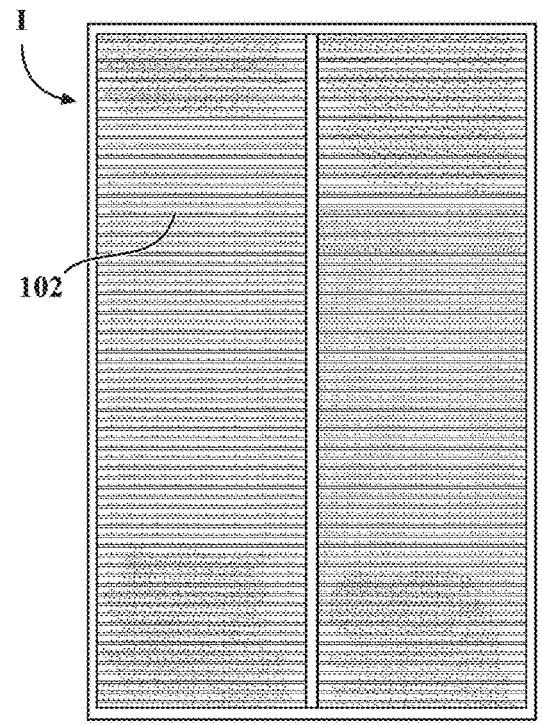
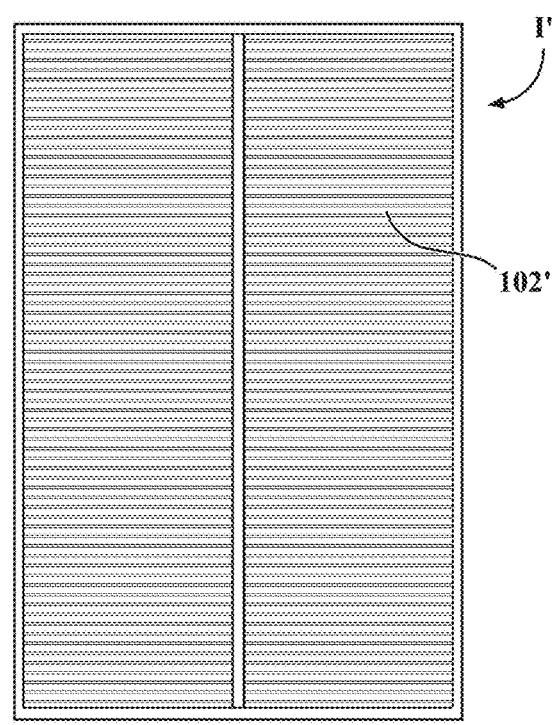
FIG. 3A  FIG. 3B
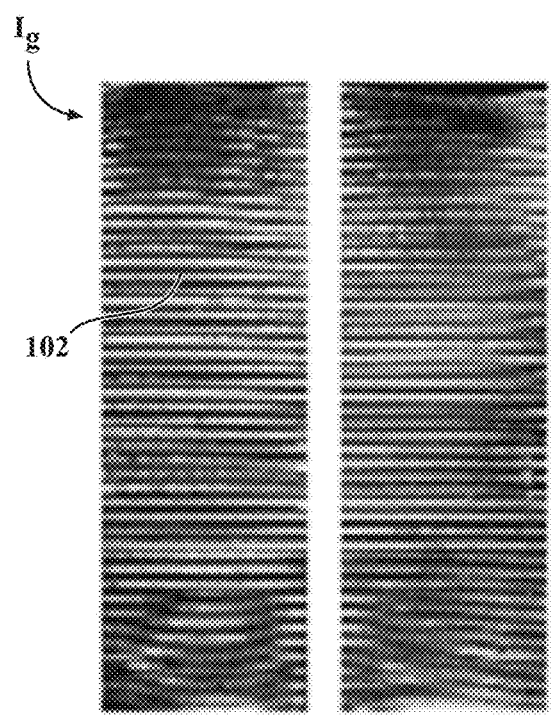
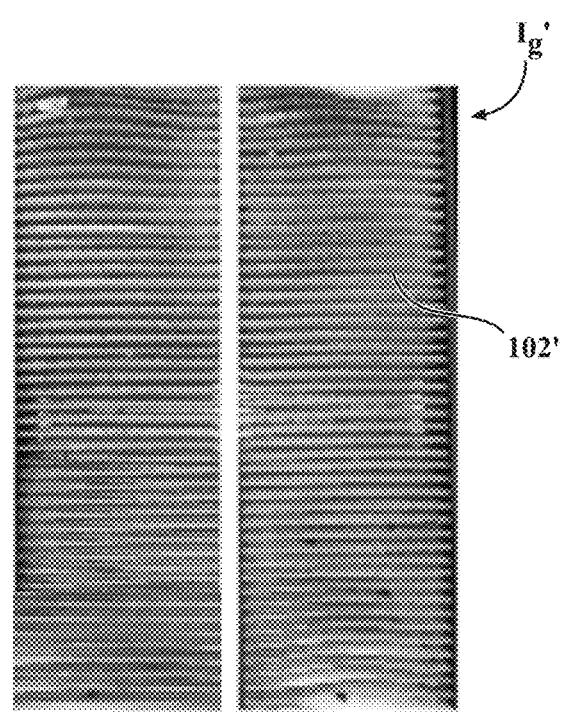
FIG. 4A  FIG. 4B

AIR FILTER WEAR LEVEL ESTIMATION AND REPLACEMENT TIMING PREDICTION METHOD

TECHNICAL FIELD

The present disclosure relates to air filters for vehicles, and, more specifically, to systems and methods for estimating wear and predicting the remaining usable life of an air filter.

BACKGROUND

Air filters are designed to inhibit (if not entirely prevent) particulate (e.g., debris, dirt, dust, pollen, pollutants, and other such contaminants) from entering a vehicle's engine, radiator, fuel lines, etc. Over time, however, particulate aggregates on the air filter, degrading performance and ultimately necessitating replacement.

Conventionally, air filters are inspected and evaluated visually. For example, during vehicle maintenance (e.g., at a vehicle dealership or service center), the air filter is often removed from the vehicle, the air filter is held to a light source, and the amount of light passing through the air filter is then used as a gauge for wear. This method, however, is inaccurate (e.g., due to variability in the light source being used, user error, disparity in opinion and lack of standardized training protocol, etc.), and offers little (if any) information as to the remaining usable life of the filter.

The present disclosure addresses these deficiencies, and describes systems and methods that provide more reliable, accurate estimates as to the wear of an air filter and timing for replacement.

SUMMARY

In one aspect of the present disclosure, an inspection system for an air filter in a vehicle is described. The inspection system includes a receptacle defining an enclosed interior space that is configured to receive the air filter, and a light source that is positioned within the receptacle. The receptacle includes an upper wall with an aperture that is arranged in generally parallel relation to the air filter, and the light source is configured to support the air filter such that the light source backlights the air filter to facilitate capture of an image of the air filter through the aperture in the upper wall of the receptacle.

In certain embodiments, the light source may be configured as an LED light source.

In certain embodiments, the light source may be variable in intensity.

In certain embodiments, the light source may define a cross-sectional surface area greater than a corresponding cross-sectional surface area defined by the air filter.

In certain embodiments, the light source may include a generally planar configuration.

In certain embodiments, the inspection system may further include an intervening member that is positioned adjacent to the light source such that the intervening member is positionable between the light source and the air filter to separate the air filter from the light source.

In certain embodiments, the intervening member may be configured as a neoprene sheet.

In certain embodiments, the intervening member and the light source may be similar in shape and size.

In certain embodiments, the intervening member may define an open interior region that is similar in shape and size to the air filter such that light passes from the light source, through the open interior region of the intervening member, and into the air filter.

In certain embodiments, the receptacle may define an overall height of at least 8".

In another aspect of the present disclosure, a method for measuring and predicting air filter wear in a vehicle is described. The method includes: backlighting a used air filter within a receptacle; capturing an image of the used air filter through an aperture in the receptacle; and comparing the image of the used air filter to an image of a corresponding unused air filter using a comparison algorithm or a similarity metric.

In certain embodiments, capturing the image of the used air filter may include capturing a colorized image of the used air filter.

In certain embodiments, the method may further include converting the colorized image of the used air filter into a grayscale-image. In such embodiments, comparing the image of the used air filter to the image of the unused air filter may include comparing the grayscale-image of the used air filter to a grayscale-image of the unused air filter.

In certain embodiments, comparing the grayscale-image of the used air filter to the grayscale-image of the unused air filter may include using an earth mover's distance algorithm.

In certain embodiments, comparing the grayscale-image of the used air filter to the grayscale-image of the unused air filter may generate a wear value for the used air filter. In such embodiments, the method may further include comparing the wear value to a threshold value.

In certain embodiments, the method may further include calculating an estimated time of replacement for the used air filter by converting a difference between the wear value and the threshold value into a distance metric or a time metric.

In another aspect of the present disclosure, a method for predicting air filter wear in a vehicle is described. The method includes: transmitting operational data from the vehicle to an Internet-hosted service; calculating an estimated wear value for a used air filter in the vehicle using the operational data; capturing an image of the used air filter; comparing the image of the used air filter to a standardized image of a corresponding unused air filter to generate an actual wear value; comparing the estimated wear value to the actual wear value; updating the estimated wear value based on the actual wear value; and calculating an estimated time of replacement for the used air filter using the operational data transmitted from the vehicle.

In certain embodiments, updating the estimated wear value may include uploading the actual wear value to the Internet-hosted service.

In certain embodiments, transmitting the operational data may include transmitting airflow data from the vehicle.

In certain embodiments, calculating the estimated wear value may include using the airflow data from the vehicle and particulate concentration data corresponding to one or more locations of the vehicle such that the estimated wear value reflects a volume of particulate collected by the used air filter.

In certain embodiments, transmitting the operational data may include transmitting the location of the vehicle using data collected from a positioning system in the vehicle.

BRIEF DESCRIPTION OF THE DRAWINGS

According to common practice, the various features of the drawings may not be to scale, and may be arbitrarily expanded or reduced for clarity.

FIG. 3A is an image of the used air filter illustrating particulate collection.

FIG. 3B is an image of a corresponding unused air filter.

FIG. 4A is a grayscale-image of the used air filter seen in FIG. 3A.

FIG. 4B is a grayscale-image of the unused air filter seen in FIG. 3B.

DETAILED DESCRIPTION

The present disclosure describes systems and methods of using analytics to evaluate and estimate the wear on an air filter in a vehicle, and to predict the remaining usable life of the air filter.

During vehicle maintenance, the vehicle's (used) air filter can be removed and evaluated using an inspection system according to the principles of the present disclosure. More specifically, the used air filter can be placed into a receptacle of the inspection system, and an image of the used air filter can be captured using any suitable device. The captured image can then be compared to an image of a corresponding unused air filter to generate a wear value reflecting particle loading (i.e., the amount of particulate that has been collected by the used air filter). The wear value can then be compared to a threshold value to determine whether replacement (or cleaning) of the used air filter is required. In the event that replacement is not yet required, via extrapolation, the remaining usable life of the air filter, as well as the replacement timing, can be estimated and expressed in terms of mileage (or an interval of time, such as days, weeks, months, etc.).

The principles of the present disclosure may be applied to both connected vehicles (i.e., vehicles including (telematics) control units that communicate with a data center, such as a cloud-based system or Internet-hosted service), as well as non-connected vehicles (i.e., vehicles that are devoid of such control units). By combining data transmitted to the data center from the connected vehicles (e.g., GPS information, odometer readings, average speed and acceleration, average RPMs, etc.) with known particulate concentration data (e.g., air quality indices, air temperature, air mass, etc.), particle loading (and an associated wear value) can be estimated for the air filter in any given vehicle. The estimated wear value, which may be stored in the data center and accessed at any time, can then be compared to the actual wear value measured during maintenance using the inspection system described herein. The estimated wear value can be updated as necessary (e.g., via uploading to the data center) for use as a baseline measure going forward, and the process can be repeated during subsequent maintenance visits to continuously update, and improve the accuracy of, the estimated wear value.

In certain implementations of the present disclosure, it is envisioned that a database may be created including information for each of the vehicles connected to the data center. Using the information contained in the database, regressions may be performed not only to estimate the current wear and remaining usable life for the used air filter in any connected vehicle, but to predict the time of replacement based upon preceding operation and usage.

Figure 1:
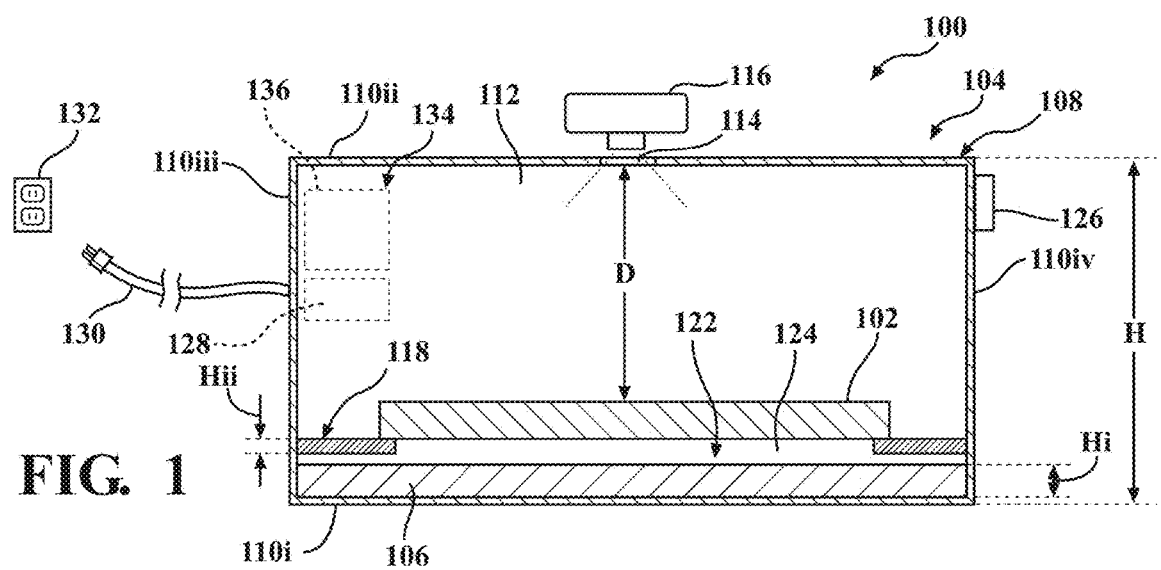
FIG. 1 is a side, cross-sectional view of an inspection system used to capture an image of a used air filter.
Figure 2A:
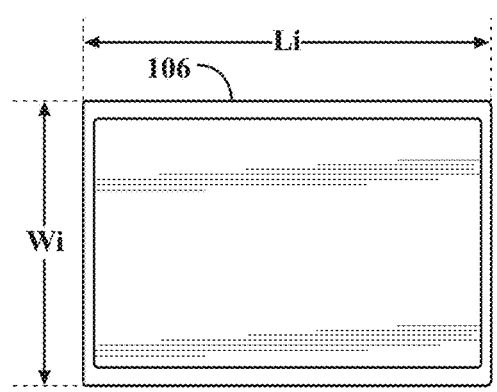
FIG. 2A is a top, plan view of a light source of the inspection system used to backlight the used air filter.
Figure 2B:
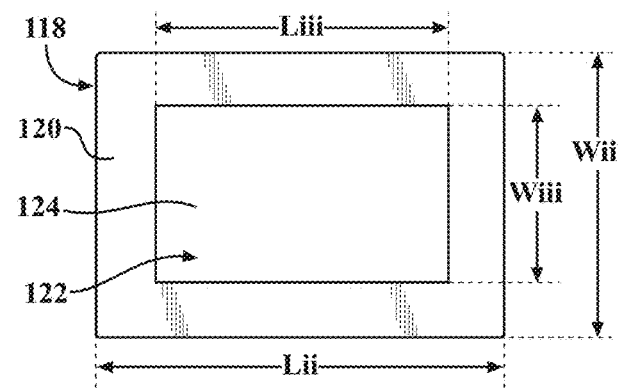
FIG. 2B is a top, plan view of an intervening member positionable between the light source and the used air filter to separate the light source and the used air filter.
Figure 2C:
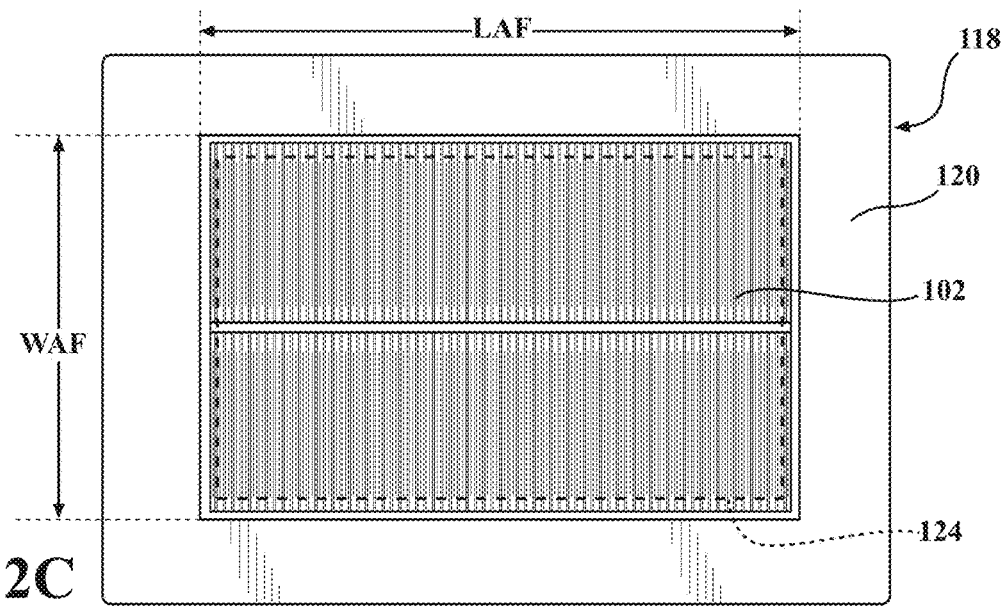
FIG. 2C is a top, plan view of the used air filter within the inspection system showing the used air filter and the intervening member positioned adjacent to the light source.
Figure 5:
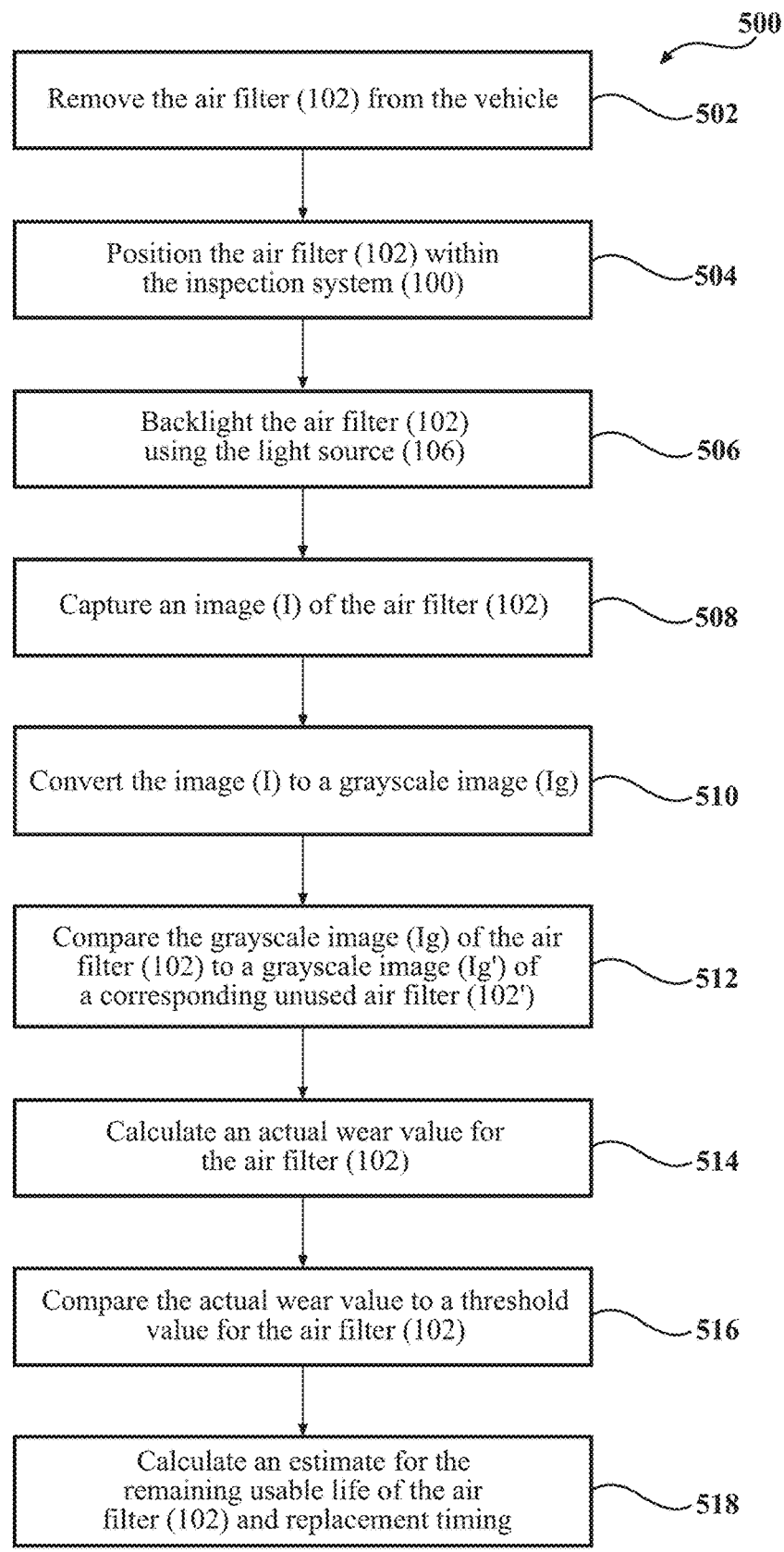
FIG. 5 illustrates use of the presently disclosed inspection system in the context of a non-connected vehicle.
Figure 6:
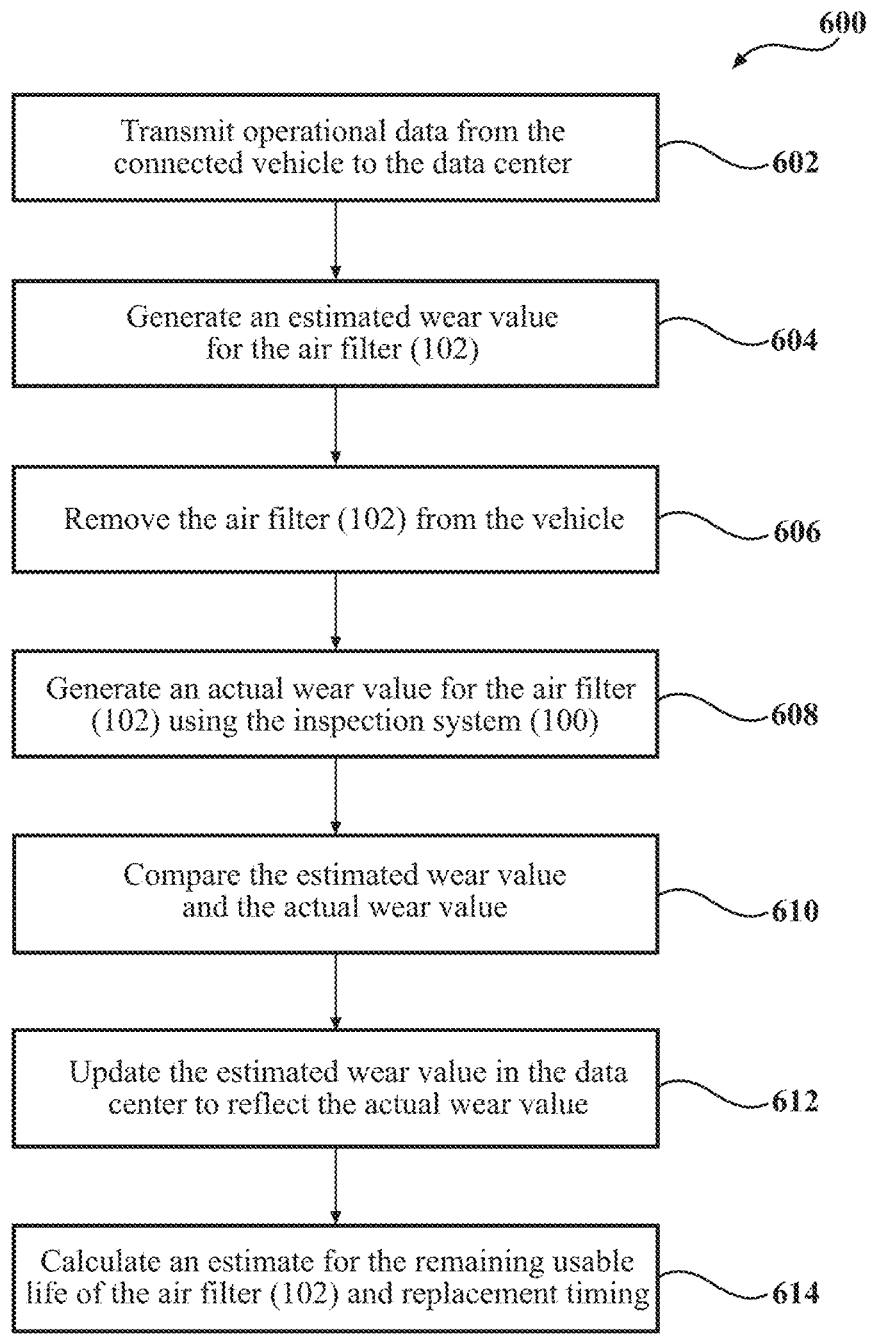
FIG. 6 illustrates use of the presently disclosed inspection system in the context of a connected vehicle.

FIGS. 1-2C illustrate an inspection system 100 for use in evaluating the wear on a used air filter 102. The inspection system 100 includes a receptacle 104 that is configured to receive the air filter 102, and a light source 106. In the illustrated embodiment, the receptacle 104 is configured as a photo box 108 (FIG. 1), but it should be appreciated that the specific configuration and construction of the receptacle 104 may be varied in alternate embodiments of the disclosure.

The receptacle 104 is defined by walls 110 that include (e.g., are formed from) one or more opaque materials (e.g., cardboard, plastic(s), polymer(s), wood, metal, etc.). More specifically, the receptacle 104 includes a lower wall (base) 110i, an upper wall 110ii, and sidewalls 110iii, 110iv that connect the respective lower and upper walls 110i, 110ii so as to collectively define an enclosed interior space 112 that is configured to receive the air filter 102. The upper wall 110ii defines an aperture 114 (FIG. 1) (e.g., an opening, slit, etc.) that allows for the capture of an image of the air filter 102 using any suitable image capture device 116 (e.g., a digital camera, or a personal electronic device, such as a tablet or an iPad®, a cell phone, etc.), as discussed in further detail below.

In the particular embodiment of the disclosure illustrated throughout the figures, the receptacle 104 defines an overall height H (FIG. 1) sufficient to support the image capture procedure described herein. For example, it is envisioned that the overall height H may be 8" or more (e.g., the overall height H may lie substantially within the range of approximately 8" to approximately 24"). It should be appreciated, however, that the specific dimensions of the receptacle 104 may be varied in alternate embodiments without departing from the scope of the present disclosure (e.g., depending upon the particular configuration of the air filter 102, the focal length and/or resolution of the image capture device 116, etc.). For example, embodiments in which the overall height H of the receptacle 104 is less than 8" are also contemplated herein.

The light source 106 may include any light source suitable for the intended purpose of illuminating (e.g., backlighting) the air filter 102, such as, for example, one or more fluorescent or LED bulbs, and may be either fixed or variable in intensity. While the inspection system 100 is shown and described as including a single light source 106 only, in alternate embodiments of the disclosure, it is envisioned that the number of light source(s) 106 may be varied. For example, an embodiment in which the inspection system 100 includes a plurality of light sources 106 would not be beyond the scope of the present disclosure.

In the particular embodiment of the disclosure shown throughout the figures, the light source 106 is generally planar and generally rectangular in configuration. More specifically, the light source 106 defines a length Li (FIG. 2A) and a width Wi that are greater than a corresponding length LAF (FIG. 2C) and a corresponding width WAF defined by the air filter 102, whereby the light source 106 defines a (horizontal) cross-sectional surface area that is greater than a corresponding (horizontal) cross-sectional surface area defined by the air filter 102. The light source 106 is, thus, configured to support the air filter 102, as described in further detail below. It should be appreciated, however, that the particular configuration and dimensions of the light source 106 may be varied in alternate embodiments of the disclosure. Moreover, although the light source 106 is shown and described as including a definite configuration, in certain embodiments, it is envisioned that the configuration of the light source 106 may be variable. For example, the light source 106 may include a plurality of repositionable bulbs to allow for reconfiguration of the light source 106 in accordance with the configuration of the air filter 102.

The light source 106 is configured for orientation within the receptacle 104 such that, when activated, the light source 106 backlights the air filter 102. To facilitate such backlighting, in certain embodiments, it is envisioned that the light source 106 may support the air filter 102. More specifically, as seen in FIG. 1, the light source 106 may be configured to support the air filter 102 such that the lower wall (base) 110$i$ and the upper wall 110$ii$ are arranged in generally parallel relation to the air filter 102, and the sidewalls 110$iii$, 110$iv$ are arranged in generally orthogonal relation to the air filter 102.

In certain embodiments, it is envisioned that the air filter 102 may be positioned directly upon the light source 106. Alternatively, however, as shown throughout the figures, the inspection system 100 may include one or more intervening members 118 that are configured for positioning adjacent to the light source 106 such that the intervening member(s) 118 separate the light source 106 and the air filter 102. In the particular embodiment of the disclosure shown throughout the figures, for example, the inspection system 100 includes a single intervening member 118 configured as a sheet (film) 120 (FIGS. 2B, 2C) that includes (e.g., is formed partially or entirely from) a compliant material, such as neoprene. It should be appreciated, however, that the particular number of intervening members 118, and/or the material(s) of construction for the intervening member(s) 118, may be varied without departing from the scope of the present disclosure.

The configuration of the intervening member(s) 118 generally corresponds to that of the light source 106 (i.e., the intervening member(s) 118 and the light source 106 are similar in shape and size). More specifically, as illustrated in the embodiment seen throughout the figures, the intervening member 118 may be generally planar and generally rectangular in configuration, and may define a length Lii (FIG. 2B) and a width Wii that are approximately equivalent to the length Li and the width Wi defined by the light source 106. It should be appreciated, however, that the configuration and/or dimensions of the intervening member 118 may be varied in alternate embodiments of the disclosure. For example, rather than a single, unitary structure, it is envisioned that the intervening member 118 may instead be configured as a series of discrete spacers.

The intervening member 118 defines an open interior region 122 (e.g., a window 124) including a configuration that generally corresponds to that of the air filter 102 (i.e., the open interior region 122 and the air filter 102 are similar in shape and size). More specifically, in the illustrated embodiment, the window 124 is generally rectangular in configuration, and defines a length Liii (FIG. 2B) and a width Wiii that are slightly smaller than the length LAF and the width WAF defined by the air filter 102. Although the length Liii and the width Wiii defined by the window 124 are contemplated as falling substantially within the range of approximately 75% to approximately 99% of the length LAF and the width WAF defined by the air filter 102, in various embodiments of the disclosure, it is envisioned that the relative dimensioning of the window 124 and the air filter 102 may be varied as necessary (e.g., depending upon the intensity of the light source 106, the configuration and/or the materials of construction for the air filter 102, etc.).

Power may be supplied to the inspection system 100 and the light source 106 in any suitable manner. For example, the inspection system 100 (e.g., the receptacle 104 or the light source 106) may include a power cord 130 (FIG. 1) to allow for connection to an external power source 132 (e.g., an AC wall receptacle, a generator, a battery, etc.). Additionally, or alternatively, the inspection system 100 may include an integrated power source 134 (e.g., a battery 136), which may be incorporated in any suitable manner. For example, as seen in FIG. 1, it is envisioned that the integrated power source 134 may be incorporated into the receptacle 104.

With reference now to FIGS. 1-4B and 5, a method 500 (FIG. 5) of using of the inspection system 100 (FIGS. 1-2C) will be discussed in the context of a non-connected vehicle. During maintenance of the vehicle (e.g., at a dealership or service center), the air filter 102 may be removed from the vehicle (operation 502) and positioned within the receptacle 104 (operation 504) of the inspection system 100, either directly upon the light source 106, or upon the intervening member 118, such that the air filter 102 is spaced a distance D (FIG. 1) from the aperture 114 in the upper wall 110$ii$ of the receptacle 104 (and the image capture device 116). Although the distance D is contemplated as being substantially within the range of approximately 10" to approximately 15", the distance D may be varied in any suitable manner (e.g., by varying the overall height H (FIG. 1) of the receptacle 104, respective heights Hi, Hii of the light source 106 and/or the intervening member(s) 118, etc.).

Upon activation of the inspection system 100 (operation 506), the light source 106 backlights the air filter 102 such that light emitted from the light source 106 passes into and through the air filter 102 (e.g., via the window 124 defined by the intervening member 118). An image I (FIG. 3A) of the backlit air filter 102 can then be captured through the aperture 114 (FIG. 1) in the upper wall 110$ii$ of the receptacle 104 using the image capture device 116 (operation 508). It is envisioned that the image capture device 116 may be utilized to capture a colorized (e.g., a partial or full-color) image I (FIG. 3A) of the air filter 102, which may then be converted to a grayscale-image Ig (FIG. 4A) (operation 510). For example, it is envisioned that the colorized image I may be converted into a set of grayscale-images for each color channel, and that the set of grayscale-images may be averaged to arrive at the grayscale-image Ig. Alternatively, however, it is envisioned that the image I of the air filter 102 may be captured by the image capture device 116 directly in grayscale.

Using an EMD (earth mover's distance) algorithm, similarity metric, or any other such suitable method of computation (such as the Kolmogorov-Smirnov test), the grayscale-image Ig (FIG. 4A) of the air filter 102 is then compared to a baseline image (operation 512), such as a grayscale-image Ig' (FIG. 4B) of a corresponding unused air filter 102'. For example, it is envisioned that the algorithm may compare the images Ig, Ig' via conversion into corresponding normed histograms, and that the calculated EMDs may be plotted as relative measures.

In certain embodiments of the disclosure, it is envisioned that the grayscale-image Ig' of the unused air filter 102' may be standardized and stored in a database (or other such suitable repository). Additionally, it is envisioned that the grayscale-image Ig' may be obtained by converting a colorized image I' (FIG. 3B) of the unused air filter 102 captured by the image capture device 116, or that the grayscale-image Ig' may be captured directly by the image capture device 116.

By measuring the discrepancy between the grayscale-images Ig, Ig' via analysis of the coloration (and/or darkness) of the pixels, an actual wear value can be calculated (operation 514), which can then be compared to a known threshold value (operation 516), which may be calculated for each particular air filter 102 in advance via testing in a controlled environment. Should the actual wear value exceed the threshold value, a recommendation can be made to replace the air filter 102. However, should the threshold value exceed the actual wear value, the air filter 102 can simply be reinstalled in the vehicle. It should be understood and appreciated that air filters 102 may differ from vehicle to vehicle, and, thus, that the threshold value may vary from air filter 102 to air filter 102 based, for example, upon make, model, materials of construction, etc.

When replacement of the air filter 102 is not yet warranted, the remaining usable life of the air filter 102 (and time of replacement) can be estimated as a distance metric and/or a time metric via extrapolation by factoring in the mileage and/or the time interval between maintenance visits/inspections (operation 518), as well as the difference between the actual wear value and the threshold value. For example, in the context of a new vehicle, during the first maintenance visit/inspection (e.g., at 6 months and 5,000 miles), if it is determined that the actual wear value is one-third of the threshold value, the remaining usable life (and time of replacement) may be estimated at 12 months and 10,000 miles (i.e., a replacement recommendation may be made at the earlier of 18 months and 15,000 miles). During subsequent maintenance visits/inspections, similar calculations and extrapolations may be performed to account for driving habits, tendencies, etc., by comparing the wear value calculated at the time of the preceding maintenance visit/inspection to the current wear value and the threshold value.

In certain embodiments, it is envisioned that the inspection system 100 may be configured to automatically perform the calculation(s) mentioned above upon image capture. For example, the inspection system 100 may include a user interface 126 (FIG. 1) that is configured to receive input data (e.g., the mileage of the vehicle, the interval of time since the previous maintenance visit/inspection, identification information for the make/model of the vehicle and/or the air filter 102, etc.) such that the threshold value can be accessed and compared to the actual wear value calculated using the aforementioned method, which may be performed by a processor 128 (FIG. 1), either integrated into the inspection system 100, as seen in FIG. 1, or located remotely. The inspection system 100 may then automatically output the remaining usable life and/or the time of replacement (e.g., to the user interface 126).

Referring now to FIGS. 1-4B and 6, a method 600 (FIG. 6) of using of the inspection system 100 (FIGS. 1-2C) will be discussed in the context of a connected vehicle. In a connected vehicle, it is envisioned that the included (telematics) control unit may continuously transmit operational data to the data center (e.g., any suitable cloud-based system or Internet-hosted service) (operation 602), which may include, for example: trip data (e.g., GPS information including start and end points received from a positioning system in the vehicle, total trip mileage, average speed during a trip, average acceleration during a trip, etc.); journey data (e.g., a summary of all trips on a given day or in a given interval of time); and health/status data (e.g., average RPMs, odometer readings, location, compression ratios within the engine, engine temperature, fuel consumption, etc.). It is envisioned that the operational data may be transmitted from the connected vehicle to the data center in any suitable interval (e.g., every thirty seconds, every minute, every thirty minutes, etc.).

By combining the operational data received from the connected vehicle with known particulate concentration data (e.g., air quality indices, air temperature, air mass, etc.) for the specific area(s) or region(s) in which the vehicle has traveled (which can be ascertained from the GPS information transmitted by the vehicle's control unit), particle loading and wear on the air filter 102 can be estimated to generate an estimated wear value for the air filter 102 (operation 604). For example, airflow volume into the engine of the vehicle can be calculated using data transmitted to the data center pertaining to RPMs and time. The airflow volume can then be combined with the relevant particulate concentration data to generate an estimated wear value for the air filter 102 that reflects the amount (volume) of particulate collected. The estimated wear value for the air filter 102 may be continuously updated during operation of the vehicle, and it is envisioned that the estimated wear value for the air filter 102 in each connected vehicle may be stored in the data center to permit access to the estimates at any time.

At the time of vehicle maintenance (e.g., at a vehicle dealership or other service center), the air filter 102 can be removed from the vehicle (operation 606) and evaluated using the inspection system 100 discussed above (FIGS. 1-5) to generate the actual wear value for the air filter 102 (operation 608). The estimated and actual wear values can then be compared (operation 610), and, to the extent that there is any inconsistency, the estimated wear value can be updated in the data center to reflect the actual wear value (operation 612) (i.e., the actual wear value can be uploaded to the data center to supplement or replace the estimated wear value). The actual wear value may then serve as a baseline measure for wear on the air filter 102 from that point forward.

In addition to estimating current wear for the air filter 102 in a particular connected vehicle, the operational data stored in the data center may also be used to estimate the remaining usable life of the air filter 102 (operation 614). More specifically, by performing regression calculations on the data collected from the connected vehicle, the replacement timing for the air filter 102 can be predicted.

Upon subsequent maintenance, the process can be repeated, and the then-current estimated wear value can be compared to the actual wear value measured by the inspection system 100 to improve the calibration of the estimate, and to update the predicted replacement timing for the air filter 102. The continuous transmission of operational data from the vehicle to the data center allows the wear value of the air filter 102 and the predicted replacement timing to be continually updated. As the estimated wear value of the air filter 102 approaches the threshold value (i.e., the value at which replacement of the air filter 102 may be suggested), it is envisioned that an alert may be generated and communicated to the user (e.g., through the vehicle).

By continuously collecting, updating, and recalibrating the estimated wear value for the air filter 102 in each connected vehicle, it is envisioned that the accuracy of the estimates generated may improve over time to such an extent that the difference between the estimated wear value and the actual wear value measured during vehicle maintenance (if any) may become negligible. It is further envisioned that the operational data and estimate information may be stored and compiled in a sortable database for any number of makes and models of vehicles and air filters 102 so as to eventually eliminate the need for any physical inspection of the air filters 102, whereby the estimated time for replacement of the air filter 102 for a given vehicle may be calculated via reference to the location(s) of the vehicle, driving habits, vehicle usage, air quality, etc. stored in the database.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An inspection system for an air filter in a vehicle, comprising:
   a receptacle defining a height extending along a first axis and an enclosed interior space configured to receive the air filter;
   a light source positioned within the receptacle to directly illuminate the air filter, the light source being configured to support the air filter such that the light source backlights the air filter to facilitate capture of an image of the air filter through an aperture in an upper wall of the receptacle, the light source defining a length and a width extending along respective second and third axes that are greater than a corresponding length and a corresponding width defined by the air filter; and
   an intervening member positioned adjacent to the light source such that the intervening member is positionable between the light source and the air filter to separate the air filter from the light source, wherein the light source, the intervening member, and the air filter include corresponding configurations, the intervening member defining an open interior region with a configuration corresponding to that defined by the air filter, wherein the open interior region defines a length and a width that are approximately equivalent to the length and the width defined by the air filter such that light passes from the light source, through the open interior region of the intervening member, and into the air filter.

2. The inspection system of claim 1, wherein the light source is configured as an LED light source.

3. The inspection system of claim 1, wherein the light source is variable in intensity.

4. The inspection system of claim 1, wherein the light source defines a cross-sectional surface area greater than a corresponding cross-sectional surface area defined by the air filter.

5. The inspection system of claim 1, wherein the intervening member is configured as a neoprene sheet.

6. The inspection system of claim 1, wherein the intervening member defines a length and a width that are approximately equivalent to the length and the width defined by the light source.

7. The inspection system of claim 1, wherein the receptacle defines an overall height of at least 8".

8. An inspection system for a used air filter in a vehicle, comprising:
   a receptacle defining an enclosed interior space configured to receive the used air filter;
   a light source positioned within the receptacle such that the used air filter and the light source are oriented along a vertical axis in relation to each other, the light source defining a horizontal cross-sectional surface area greater than a corresponding horizontal cross-sectional surface area defined by the used air filter;
   an intervening member positioned adjacent to the light source such that the intervening member is positionable between the light source and the used air filter to separate the used air filter from the light source, the intervening member defining an open interior region defining a length and a width that are approximately equivalent to those defined by the used air filter such that light passes from the light source, through the open interior region of the intervening member, and into the used air filter; and a processor supported by the receptacle, the processor being configured to measure wear on the used air filter by comparing an image of the used air filter to an image of a corresponding unused air filter and predict a remaining usable life of the used air filter.

9. The inspection system of claim 8, wherein the receptacle includes an upper wall defining an aperture and the light source is positioned within the receptacle such that the light source backlights the used air filter to facilitate capture of an image of the used air filter through the aperture in the upper wall.

10. The inspection system of claim 8, wherein the light source defines a length and width greater than those defined by the used air filter.

11. The inspection system of claim 10, wherein the light source is configured for direct contact with the used air filter such that the used air filter is supported by the light source upon positioning of the used air filter within the receptacle.

12. An inspection system for an air filter in a vehicle, comprising:
a receptacle defining an enclosed interior space configured to receive the air filter;
a light source positioned within the receptacle to directly illuminate the air filter such that the air filter and the light source are arranged along a Y-axis, the light source defining a cross-sectional surface area measured along an X-axis and a Z-axis greater than a corresponding cross-sectional surface area defined by the air filter;
an intervening member positioned adjacent to the light source such that the intervening member is positionable between the light source and the used air filter to separate the used air filter from the light source, the intervening member defining an open interior region defining a length and a width that are approximately equivalent to those defined by the air filter such that light passes from the light source, through the open interior region of the intervening member, and into the air filter; and
a processor supported by the receptacle and configured to predict a remaining usable life of the air filter.

13. The inspection system of claim 12, wherein the light source defines a length and width greater than those defined by the air filter.

* * * * *